L. SPÄNGLER.
SCARF HOLDER.
APPLICATION FILED NOV. 9, 1915. RENEWED OCT. 2, 1917.
1,265,542.
Patented May 7, 1918.
2 SHEETS—SHEET 1.
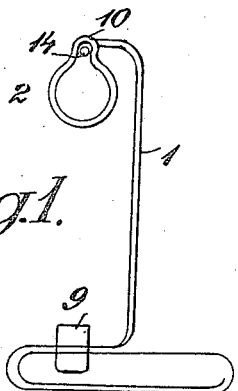
Fig.1.
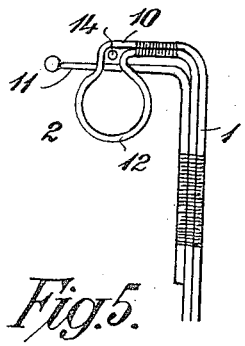
Fig.4.
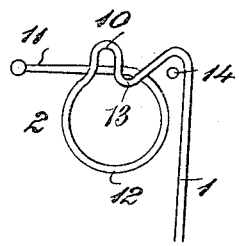
Fig.7.
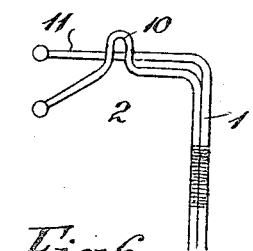
Fig.5.
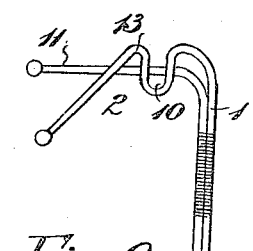
Fig.8.
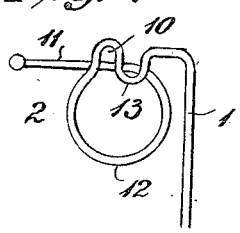
Fig.6.
Fig.9.
Inventor
Ludwig Spängler.
by Wilkinson, Fisher & MacKaye
Attorneys.

UNITED STATES PATENT OFFICE.

LUDWIG SPÄNGLER, OF VIENNA, AUSTRIA.

SCARF-HOLDER.

1,265,542.  Specification of Letters Patent.  Patented May 7, 1918.

Application filed November 9, 1915, Serial No. 60,540. Renewed October 2, 1917. Serial No. 194,414.

*To all whom it may concern:*

Be it known that I, LUDWIG SPÄNGLER, a subject of the Emperor of Austria, residing at Vienna, Empire of Austria, have invented certain new and useful Improvements in Scarf-Holders; and I do hereby declare the following to be a full, clear, and exact description of the invention, such as will enable others skilled in the art to which it appertains to make and use the same.

My invention relates to a holder for a scarf or necktie in which a shank adapted to be attached to the collar stud by means of an eyelet is provided at its lower end with a clamping device adapted to hold in position on the breast part of the shirt the free ends of the scarf or necktie.

Heretofore in necktie or scarf holders of this kind the eyelet serving for attaching the same to the collar stud was arranged directly on the top end of the shank and in line therewith. If the scarf in knotting the same is folded around this shank, the knot becomes unsymmetrical and leaves the collar stud uncovered so that the scarf looks unsightly.

According to my present invention this deficiency is avoided by arranging the eyelet for the collar stud laterally of the upper end of the shank of the holder. By these means the knot is caused to assume its correct symmetrical position and to cover the collar stud.

Further my invention comprises a special construction of the eyelet for the collar stud. This construction consists in providing a recess in the body of the eyelet such recess being bridged at one side by a resilient wire which, when pushed aside, permits the shank of the collar stud to enter into the recess and when released holds the collar stud shank in the recess.

Figure 2:
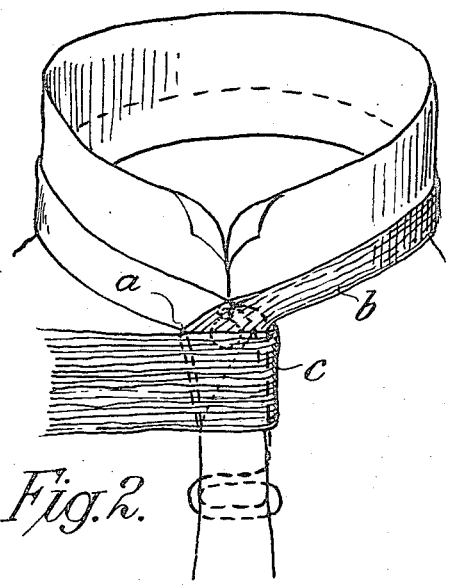
Figure 3:
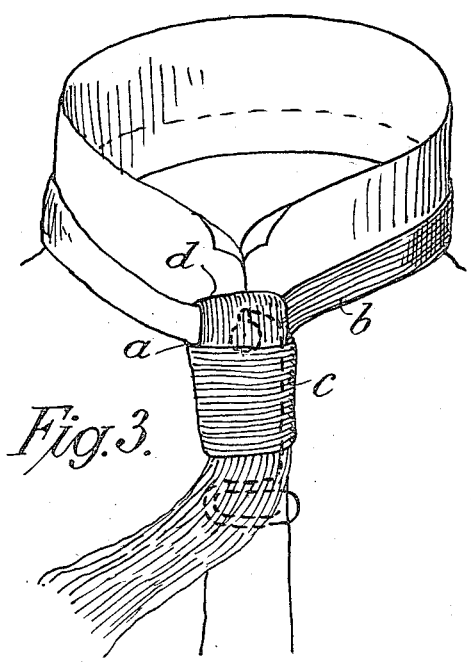

In the accompanying drawings Figure 1 shows in elevation a scarf holder embodying my invention. Figs. 2 and 3 illustrate two stages in knotting a scarf on my improved scarf holder. Fig. 4 is an elevation of a collar stud eyelet embodying my invention. Figs. 5 to 9 are similar views of modifications of my improved collar stud eyelet.

In Fig. 1, 1 is the shank of the scarf holder 3 a clamping device of any known or preferred construction at the bottom end of the shank which clamping device serves for holding the free ends or ends of the knotted scarf in position on the breast part of the shirt and 9 is a socket on the clamping device which serves to receive the point of a scarf pin and which may be of any known or preferred construction. The clamping device 3 and the socket 9 do not form part of my invention and the latter may be dispensed with.

2 is the eyelet at the top end of the shank and serves for attaching the holder to the collar stud, the shank of which is indicated at 14. According to my invention this eyelet is arranged laterally of the shank 2. The effect of this arrangement is the following:

When in knotting the scarf one of its ends b Fig. 2 indicated by hatching is folded at c from the rear side over the shank and then drawn through between the collar and the other half a of the scarf and finally drawn through below the part of the hatched scarf end at the left hand side of the fold c (Fig. 3) whereby the knot is formed in the well known manner, then for the reason that the eyelet is arranged laterally of the shank 1, as shown in the drawings at its left hand side, the knot will not only be in its correct position in the central line of the breast part of the shirt but its upper fold d will also cover or conceal the collar stud and the eyelet 2. Therefore by my scarf holder the result is obtained that the knot is in correct position and covers the collar stud, and the correct knotting of the scarf is greatly facilitated.

As shown in Fig. 4 the eyelet 2 consists of circular ring 12, provided at its upper part with a recess 10 and secured to the shank 1 of the scarf holder in any known or preferred manner. A resilient wire 11 also secured to the shank in any known or preferred manner extends across the ring 12 at its outer side which in its normal position bridges the recess 10 thus shutting the latter off from the remaining part of the ring 12. The diameter of the latter is large enough to permit the head of the collar stud to pass through freely, while the dimensions of the recess 10 are such as to permit the shank of the collar stud but not the head of the collar stud to enter.

For attaching the scarf holder to the collar stud the ring 12 is slipped over the head of the stud the cross wire 11 being bent outside and downward, and the scarf holder is pulled downward so as to cause the shank 14 of the collar stud to enter into the recess 10 as indicated in Fig. 4. The cross wire is then released and owing to its elasticity moves upward locating itself between the head of the collar stud and the ring 12, bearing against the under side of the shank 14. The scarf holder is thus held on the collar stud being prevented from any lateral and downward movement by the walls of the recess and from upward movement by the cross wire 11 bridging the open bottom side of the recess. For removing the scarf holder from the collar stud the above operations are repeated in reverse order.

In Fig. 5 the ring 12 is reduced to a short piece of wire extending from the side of the recess 10 remotest from the shank 1 of the scarf holder. The operation is substantially the same as that above described in connection with the construction shown in Fig. 4.

In the modification shown in Fig. 6 the ring 12 the recess 10 the cross wire 11 and the shank 1 of the scarf holder are made from a single piece of wire, the wire forming the shank 1 is bent laterally then forms a downwardly projecting loop 13, then the recess 10, then the major part of the circumference of the ring 12 and the free end of this piece of wire bridges the loop 13 and the recess 10 constituting the cross wire 11. The operation is the same as in the case of the construction shown in Fig. 4.

The modification shown in Fig. 7 differs from that shown in Fig. 6 only in that the side of the loop 13 adjacent to the shank 1 of the scarf holder extends obliquely to the latter. This enables the collar stud to be introduced into the recess 10 by inserting the shank 14 of the collar stud between the shank 1 and the adjacent oblique side of the loop 13 and then forcing it into the angle between this side of the loop and the ring 12. The cross wire 11 which constitutes the end of the piece of wire forming the ring 12 yields under the pressure and the collar stud shank 14 slips into the recess 10, where it is held by the resilient cross wire.

In the modification shown in Fig. 8 the recess 10 is arranged below the cross wire 11, the major part of the ring 12 being dispensed with the same as in Fig. 5.

Moreover adjacent to the side of the recess 10 remotest from shank 1 of the scarf holder a loop 13 the outer side of which is oblique is provided. This enables the shank 14 of the collar stud to be introduced into the recess 10 the same as in the case of the construction shown in Fig. 7, but as in Fig. 8 the collar stud shank is introduced from the side of the loop remotest from the shank 1 this modification is slightly more convenient.

The modification shown in Fig. 9 differs from that shown in Fig. 8 in that the oblique side of the loop is so bent that it forms a circle 12 and the cross wire 11 the same as in Figs. 6 and 7.

The modifications shown in Figs. 6, 7 and 9 offer the advantage that the eyelet for the collar stud and the shank are formed of a single piece of wire.

Claims:

1. In a scarf holder the combination of a shank, means carried by the lower end of the shank for clamping the scarf to the breast portion of the shirt an arm projecting laterally from the upper end of the said shank, and an eyelet carried by the outer end of said arm and adapted to be attached to the collar stud, substantially as and for the purpose described.

2. In a scarf holder the combination of a shank, means carried by the lower end of the shank for clamping the scarf to the breast portion of the shirt an arm projecting laterally from the upper end of the said shank, and an eyelet carried by the outer end of said arm, and adapted to be attached to the collar stud, said eyelet comprising a recess and a resilient wire bridging the open side of such recess, substantially as and for the purpose described.

3. In a scarf holder the combination of a shank, means carried by the lower end of the shank for clamping the scarf to the breast portion of the shirt and an eyelet carried by the upper end of the shank and adapted to be attached to the collar stud such eyelet being located laterally of the said shank and comprising a ring the diameter of which is large enough to permit the head of the collar stud to pass through this ring being provided with a recess on its circumference and further comprising a resilient wire bridging the open side of the said recess substantially in the line of the circumference of the ring, substantially as and for the purpose described.

4. In a scarf holder the combination of a shank, means carried by the lower end of the shank for clamping the scarf to the breast portion of the shirt and an eyelet carried by the upper end of the shank and adapted to be attached to the collar stud such eyelet being located laterally of the said shank and comprising a recess and a resilient wire bridging the open side of such recess and moreover comprising a loop opening in the opposite direction as the recess, substantially as and for the purpose described.

5. In a scarf holder the combination of a shank, means carried by the lower end of the shank for clamping the scarf to the breast portion of the shirt and an eyelet carried by the upper end of the shank and adapted to be attached to the collar stud such eyelet being located laterally of the said shank and comprising a recess and a resilient wire bridging the open side of such recess and moreover comprising a loop opening in the opposite direction as the recess one of the sides of the loop being oblique to the said resilient wire, substantially as and for the purpose described.

6. In a scarf holder the combination of a shank, means carried by the lower end of the shank for clamping the scarf to the breast portion of the shirt and an eyelet carried by the upper end of the shank and adapted to be attached to the collar stud and such eyelet being located laterally of the said shank and comprising a ring the diameter of which is large enough to permit the head of the collar stud to pass through this ring being provided with a recess on its circumference and further comprising a resilient wire bridging the open side of the said recess substantially in the line of the circumference of the ring and moreover comprising a loop in the ring opening in the opposite direction as the recess, substantially as and for the purpose described.

7. In a scarf holder the combination of a shank, means carried by the lower end of the shank for clamping the scarf to the breast portion of the shirt and an eyelet carried by the upper end of the shank and adapted to be attached to the collar stud such eyelet being located laterally of the said shank and comprising a ring the diameter of which is large enough to permit the head of the collar stud to pass through this ring being provided with a recess on its circumference and further comprising a resilient wire bridging the open side of the said recess substantially in the line of the circumference of the ring and moreover comprising a loop in the ring opening in the opposite direction as the recess one of the sides of the loop being oblique to the said resilient wire, substantially as and for the purpose described.

8. In a scarf holder the combination of a shank and an eyelet located laterally at the upper end of the shank such eyelet comprising a ring, a recess in the circumference of such ring and a resilient wire bridging the open end of such recess substantially in the line of the circumference of the ring, the said shank, the ring, the recess and the resilient wire consisting of a single piece of wire, substantially as and for the purpose described.

9. In a scarf holder the combination of a shank and an eyelet located laterally at the upper end of the shank such eyelet comprising a ring, a recess in the circumference of such ring and a resilient wire bridging the open end of such recess substantially in the line of the circumference of the ring and a loop in the ring opening in the opposite direction as the recess, the said shank, the ring, the recess, the loop and the resilient wire consisting of a single piece of wire, substantially as and for the purpose described.

In testimony whereof I affix my signature in presence of two witnesses.

LUDWIG SPÄNGLER.

Witnesses:
AUGUST FUGGER,
JOHANN FLEISCHMANN.